United States Patent [19]

Santandrea et al.

[11] Patent Number: 4,713,883
[45] Date of Patent: Dec. 22, 1987

[54] PRODUCTION LINE FOR PALLET MOUNTED ELECTRIC MOTOR STATORS

[75] Inventors: Luciano Santandrea, Tavarnelle Val Di Pesa; Sabatino Luciani, Sesto Fiorentino, both of Italy

[73] Assignee: Axis S.p.A., Italy

[21] Appl. No.: 840,671

[22] Filed: Mar. 18, 1986

[30] Foreign Application Priority Data

Jul. 11, 1985 [IT] Italy .............................. 21532 A/85
Oct. 21, 1985 [IT] Italy .............................. 53954/85[U]
Oct. 21, 1985 [IT] Italy .............................. 53955/85[U]

[51] Int. Cl.$^4$ .......................................... B23D 19/00
[52] U.S. Cl. .................................... 29/736; 29/732; 29/759; 29/760; 198/346.1; 198/465.1; 198/803.01; 242/1.1 R
[58] Field of Search ............... 29/732, 736, 596, 759, 29/760; 198/346.1, 803.01, 465.1; 242/1.1 R, 1.1 A, 1.1 E

[56] References Cited

U.S. PATENT DOCUMENTS

| | | | |
|---|---|---|---|
| 3,766,617 | 10/1973 | Forster et al. | 198/346.2 X |
| 4,106,185 | 8/1978 | Laner | 29/736 X |
| 4,151,636 | 5/1979 | Lauer et al. | 29/736 X |
| 4,289,228 | 9/1981 | Reim et al. | 198/346.1 |

FOREIGN PATENT DOCUMENTS

| | | |
|---|---|---|
| 2370659 | 6/1978 | France. |
| 2021447 | 12/1979 | United Kingdom. |
| 2069376 | 8/1981 | United Kingdom. |
| 2092029 | 8/1982 | United Kingdom. |
| 2145355 | 3/1985 | United Kingdom. |
| 0998080 | 2/1983 | U.S.S.R. ............... 29/732 |

Primary Examiner—Carl E. Hall
Attorney, Agent, or Firm—Lerner, David, Littenberg, Krumholz & Mentlik

[57] ABSTRACT

In a production line for electric motor stators, the stators are rigidly fixed individually, onto respective individual pallets which advance along conveyor belts, in proximity to which the necessary stator-working stations are located; mechanical means are also provided for removing the pallets from the belts and handling them so that the respective stators become disposed in positions corresponding with the working stations located along the line, and in proximity to which said mechanical means are provided.

6 Claims, 8 Drawing Figures

PRODUCTION LINE FOR PALLET MOUNTED ELECTRIC MOTOR STATORS

DESCRIPTION

The invention relates to a production line for pallet-mounted electric motor stators.

At the present time, stators lie directly on conveyor belts which move along lines. The various working stations are provided at the sides of these lines. These stations include the stations for slot insulation, mounting the shoulders and mounting the terminals on them, winding formation, wire end termination, terminal soldering, coil baking, and stator electrical testing.

On reaching one of these stations, the stator must be removed from the conveyor belt and positioned in the working station, after which the stator is again returned to the line for feeding to the next station.

This type of production cycle considerably penalizes productivity, as the stators have to be continuously transferred to and from the various working stations by respective members which remove them from the belts, transport them to the station, return them to the belts and position them thereon.

These members, which are complicated, also penalize the line from an economic viewpoint.

To obviate these drawbacks, the invention provides a line in which the stators are rigidly fixed to pallets which slide on the conveyor belt.

In certain stations, the required work is carried out directly on the stator without removing it from the belts, whereas in others such as the winding formation and termination stations, the pallet is raised together with the stator and rotated through 90° so that it faces the machine which is to carry out the necessary work. A translation or a rotation of the pallet is carried out, depending on the type and configuration of the working station.

By this means, the idle times involved in transferring the stator to and from the various working stations can be considerably reduced. In certain stations these transfers are not required and in other stations each transfer is simply a matter of rotating the pallet on which the stator is fixed. In addition to increasing productivity, equipment costs and the complexity of the entire line are also reduced.

These and further objects which will be more apparent hereinafter are attained according to the invention by a production line for electric motor stators, characterized in that the stators are rigidly fixed individually, on respective pallets which advance along conveyor belts, in proximity to which the necessary stator-working stations are located; mechanical means also being provided for removing the pallets from the belts and rotating them sideways so that the respective stators become disposed with their axis substantially horizontal in positions corresponding with the working stations located along the line, in proximity to which said mechanical means are provided.

One embodiment of the invention is described hereinafter by way of non-limiting example with reference to the accompanying drawings in which.

Figure 1:
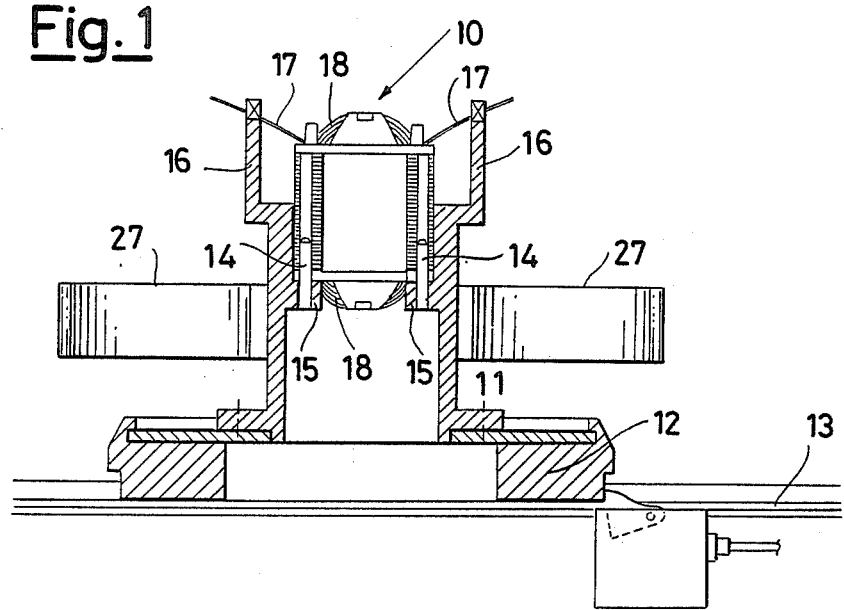
FIG. 1 is a section through a pallet, on which a stator is mounted with a vertical axis, which is advancing along a transfer line in proximity to a working station in which the pallet, as a first example of handling it, is turned over sideways.
Figure 2:
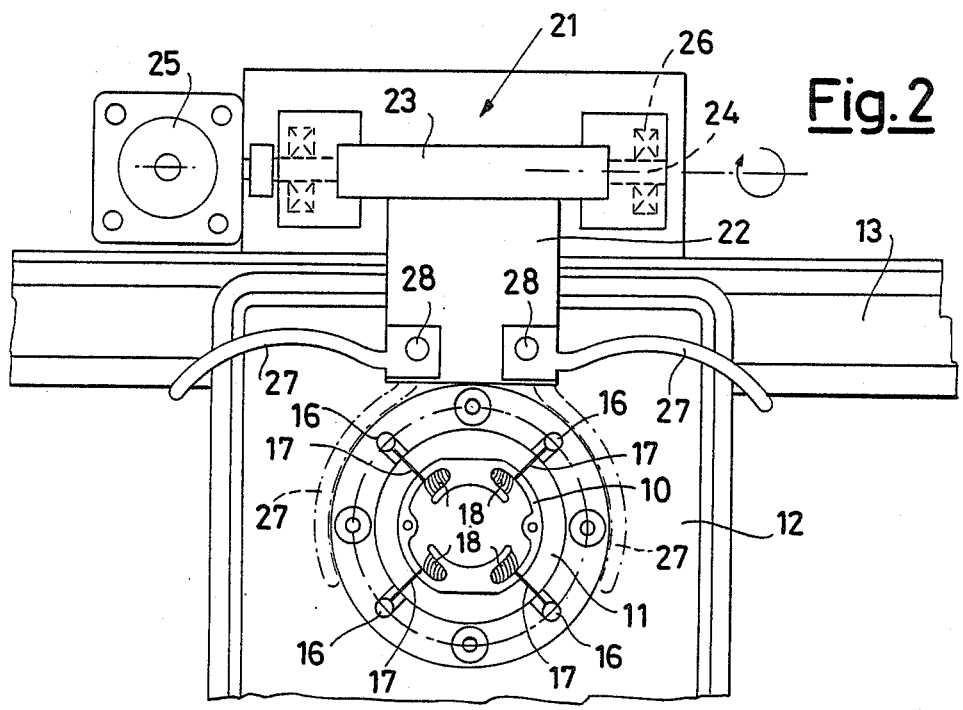
FIG. 2 is a plan view of the position shown in FIG. 1.

FIGS. 1 and 2 show a stator 10, of conventional type, mounted with its axis vertical on a hollow cylindrical body 11 fixed to a base 12. Base 12 and body 11 form a pallet which slides on the belts 13 of the transfer line. The stator 10 can, for example, be fixed by screws 14 to shoulders 15 on the body 11. Body 11 also comprises appendixes 16 used for temporarily anchoring the ends of the wires 17 after forming the windings 18 on the stator slots.

In certain working stations in which it would be very complicated to arrange the machine above the line, such as the winding formation station 20 (FIGS. 3 and 4), a device is provided for turning the pallet through 90°, this consisting of an arm 22 provided at one end with a tube 23 keyed onto the rod 24 of a rotating pneumatic cylinder.

At its other end the arm 22 is provided with jaws 27 hinged at 28, for gripping the pallet body 11. On operating the cylinder 25 and a further cylinder, suitable linkages (not shown) cause the jaws 27 to close onto the body 11, and then the arm 22 to rotate through 90° until the position shown by dashed lines in FIG. 3 is reached.

In this position, the stator 10 has its axis horizontal, snd the windings can be formed on it by means of the apparatus 20.

Figure 3:
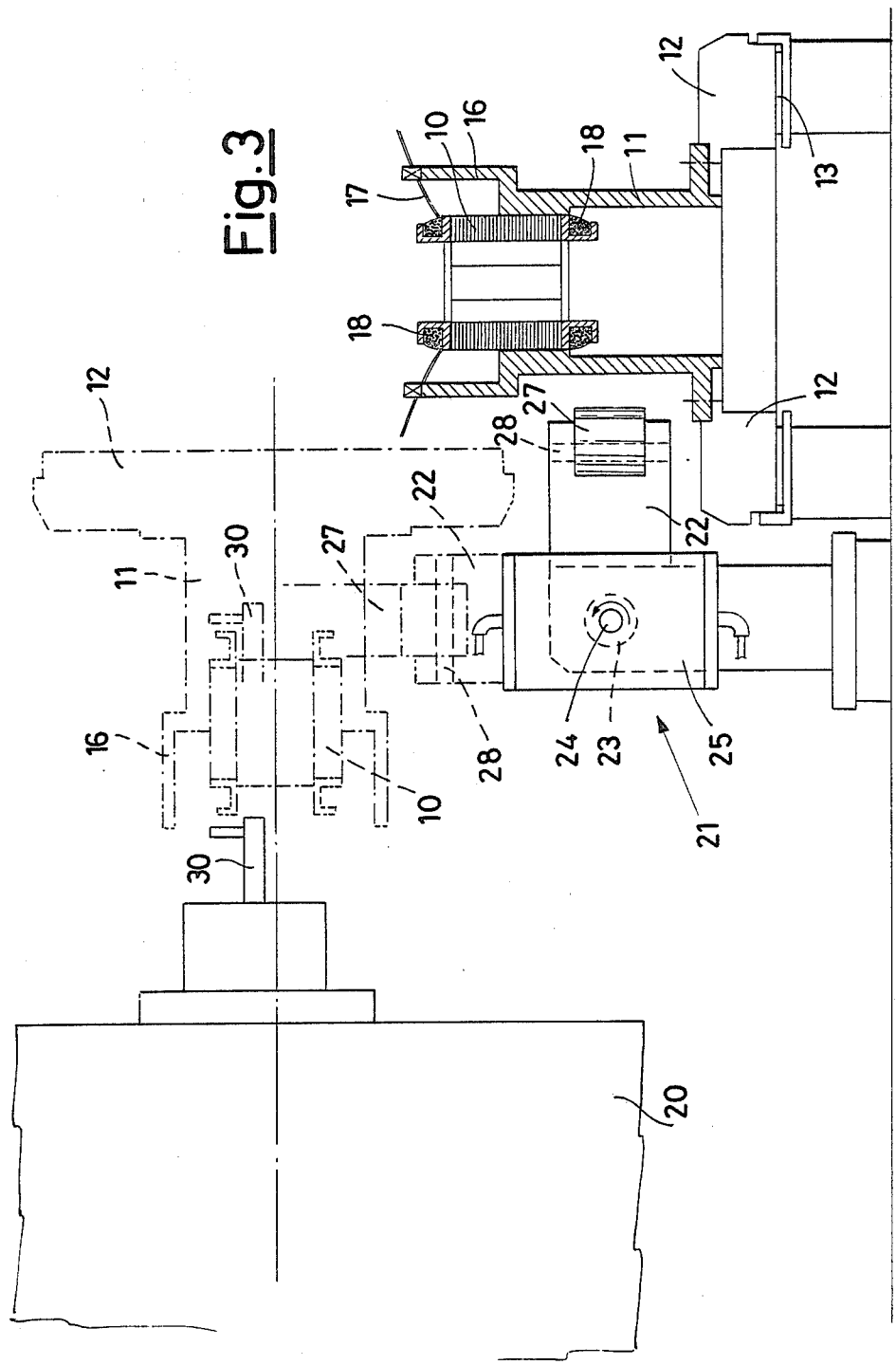
FIG. 3 is a side view of the position shown in FIGS. 1 and 2, with the pallet being shown in its turned position by dashed lines, and with a working station, namely the winding formation station, being shown diagrammatically.

FIG. 3 shows an apparatus in which the needle 30 is eccentric and enables the windings to be made without the aid of the conventional forming shoes. This form of eccentric needle 30 is the subject matter of patent application No. 20184-A/85 of 2 Apr. 1985 in the name of the present Applicant.

By the Application No. 21485-A/85 of 9 July 1985 the Applicant has also patented a second method which enables the windings to be formed without the use of forming shoes, and which could be advantageously employed on the line according to the invention. Use of forming shoes and thus of conventional apparatus for forming the windings on the stator could make it difficult to work on stators fixed to pallets, however by suitably changing the form of the pallet, the use of apparatus 20 of a type different from that shown in FIG. 3 or different from those advantageously proposed by the Applicant could be used, without leaving the scope of the invention, which does in no way aim to propose a method for forming the windings.

Figure 4:
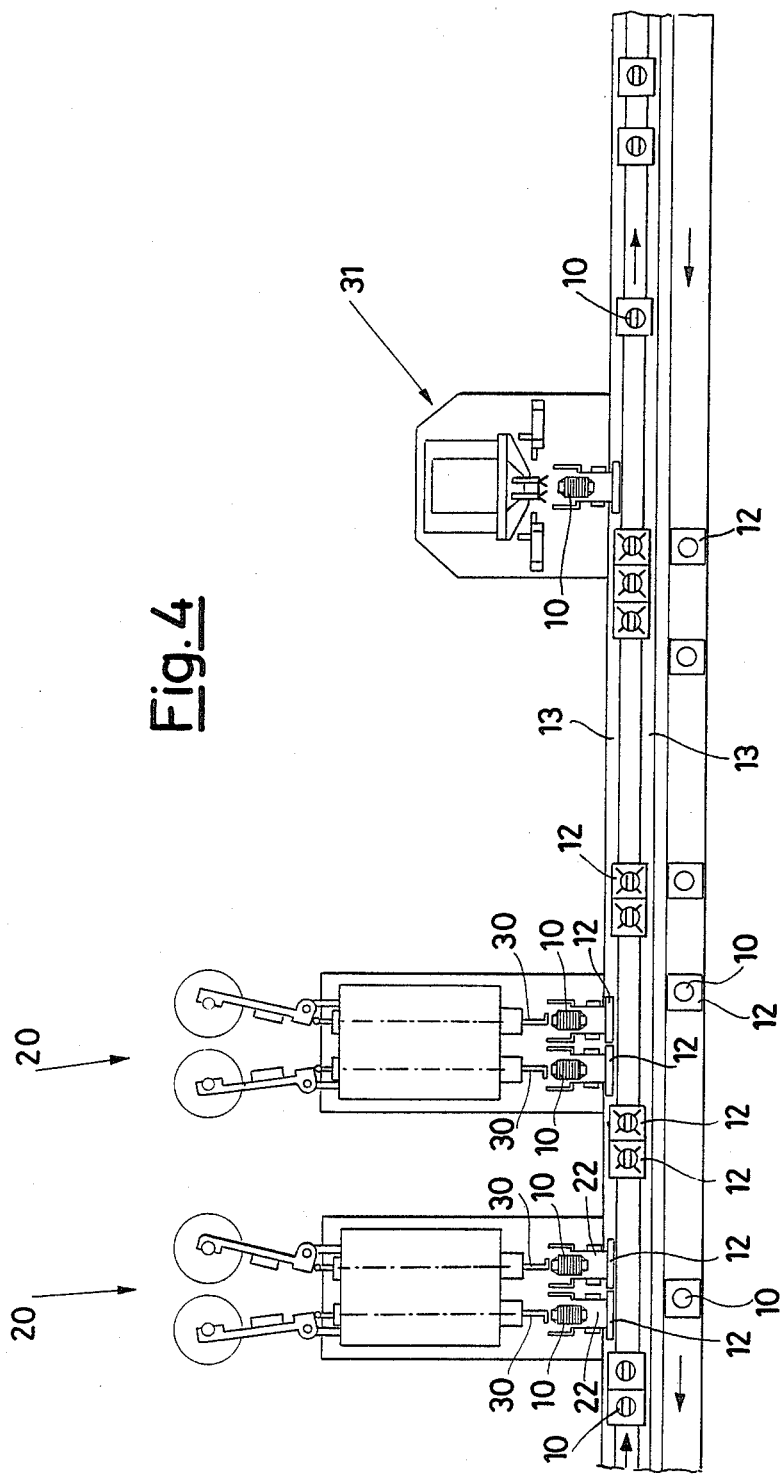
FIG. 4 is a view of a line portion comprising two winding formation stations and one termination station.

FIG. 4 shows two pairs of winding stations 20 with the aim of applying to an eccentric needle 30, the subject matter of Application No. 20184-A/85 of 2 Apr. 1985 in the name of the present Applicant, in which each needle 30 winds on one slot of a stator. In this embodiment, if two stations with suitably orientated needles 30 are placed side by side, the windings are made in the first station on two stator slots and then in the second station on the other two slots.

If, however, apparatus 20 is used in which the needles 30 simultaneously form the windings on both slots of each stator, the station 20 can be a single station while advantageously retaining the pair of needles 30 for operating simultaneously on two stators, thus increasing the line productivity.

In known manner, when the windings are finished, the ends of the wires 17 are temporarily anchored on side supports to the stator 10, which in this case are the pallet appendixes 16.

After the formation of the windings 18, the pallet is again turned through 90° and again rests on the belts 13, along which the pallet advances towards the termination station 31 (FIG. 4) where the ends of the wires 17 are fixed to the associated stator supports in known manner.

It is also advantageous in this station to provide the device 21 for rotating each pallet in order to position the stator with its axis horizontal, i.e. in a position suitable for fixing the wires 17, an operation which can be carried out in conventional manner with conventional machines.

It may be advantageous to rotate the pallet through 90° as shown in FIG. 3 at other stations along the line, both to make the station itself of simpler construction and to maintain high stator production.

It is in any event superfluous to give further examples of working stations which can require this stator movement, as the movement will always be of the type illustrated with reference to the winding formation station 20.

Figure 5:
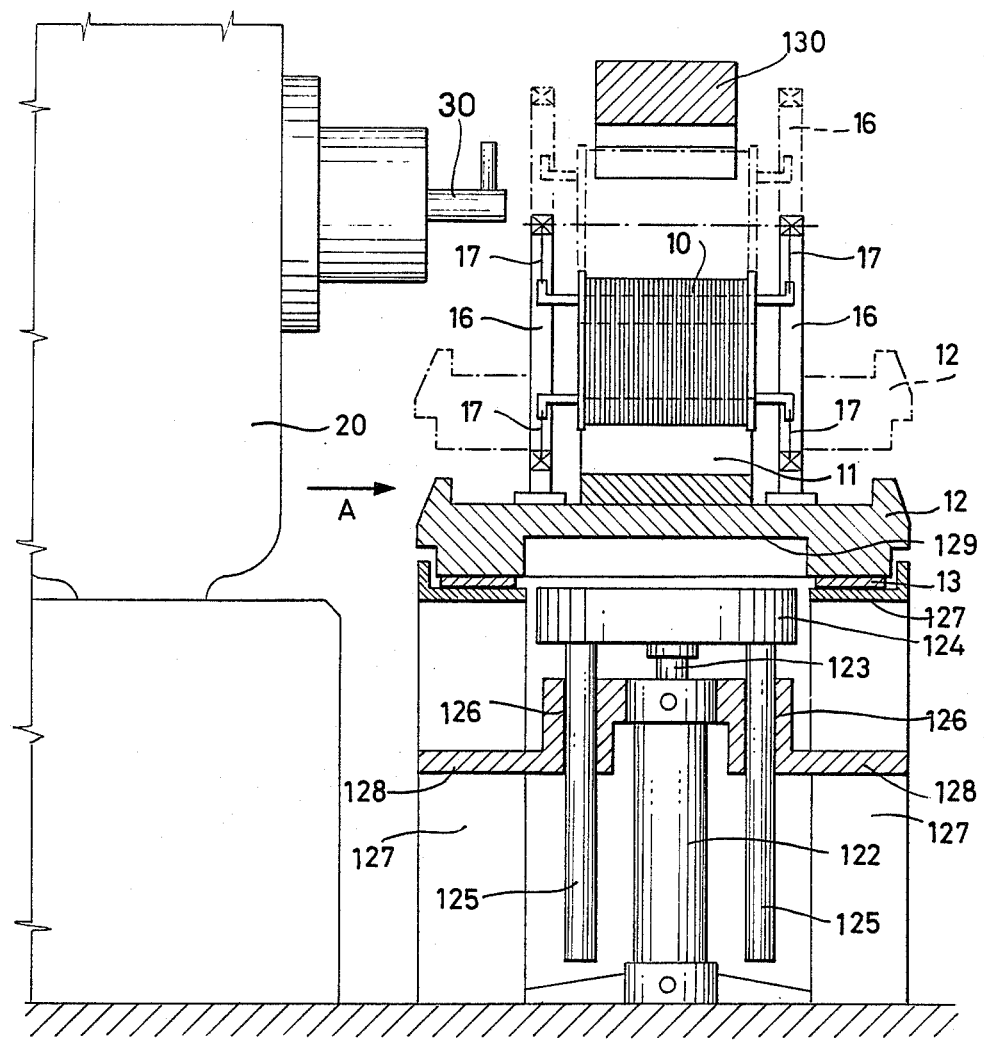
FIG. 5 is a transverse sectional view of a pallet transferring line in accordance with a further embodiment of the invention in conjunction with a working station such as the station shown in FIG. 3.
Figure 6:
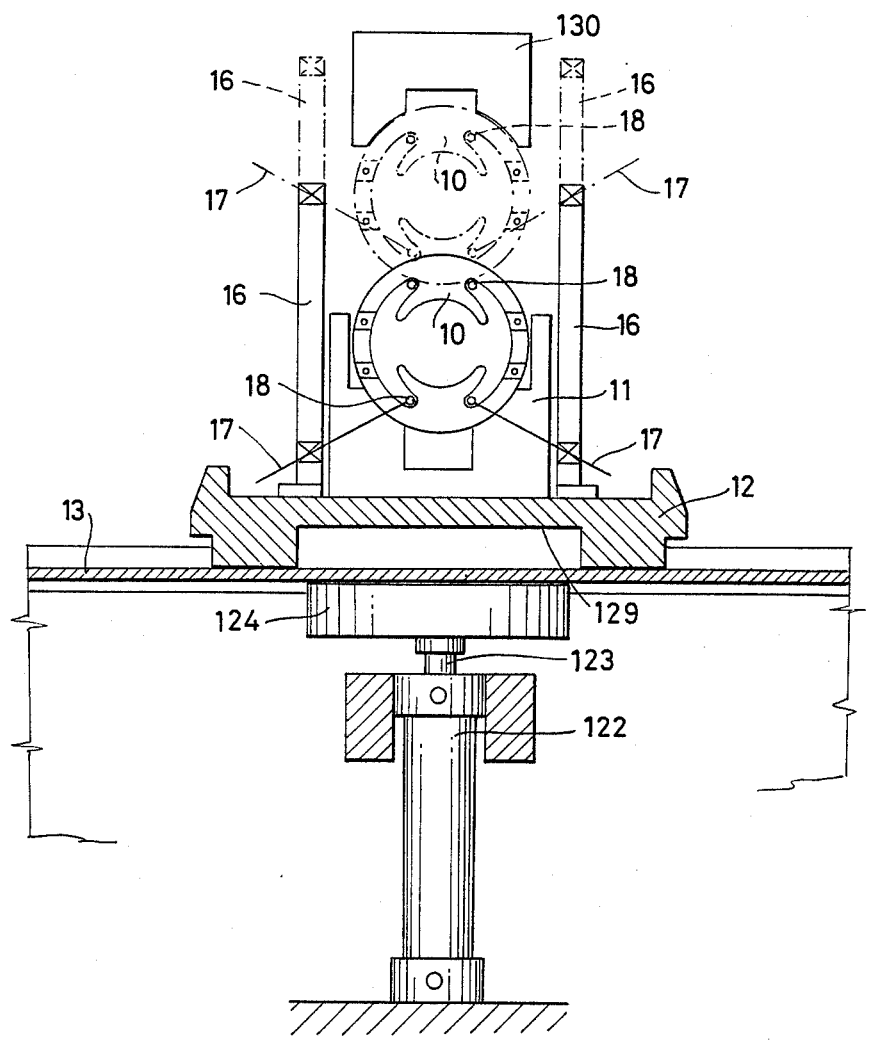
FIG. 6 is a view in the direction of the arrow of FIG. 5.

In the embodiment shown in FIGS. 5 and 6, in which same reference numerals of Figures from 1 to 4 indicate the same members, stator 10 is mounted with its axis horizontal on a hollow body 11 anchored to a base 12. Base 12 and body 11 form the pallet which slides on belts 13 of the transferring line.

Since not all the stator working stations can be positioned at the level of the advancing stator, it is necessary to translate the stator vertically in order to reach a position corresponding to the working station itself, as illustrated in FIGS. 5 and 6.

The vertical translation device of the pallet is formed, by way of example, by a cylinder 122 whose stem 123 is rigidly connected to a fork 124 provided with rods 125 which slide in guides 126 of a support 128 fixed to the frame 127 on which the belts 13 slide. Cylinder 122 is also rigidly connected to the support 128 screwed onto the frame 127.

Extension of the stem 123 of the cylinder 122 makes the rod 125 slide upwards until the fork 124 is engaged in the cavity 129 of the pallet, whereupon the pallet separates from the belts 13 and moves upwardly towards the winding needle 30 until the pallet reaches the position shown in dashed lines in FIG. 5. In this position stator is in contact with the fixed V-shaped locking and reference stop 130.

After termination of the winding, cylinder 122 is actuated in the reverse direction and the pallet moves downwardly until it again rests on the belts 13. When the pallet rests on the belts, the pallet may be transferred into the next station, which usually is the termination station. In the termination station, the ends of the wires 17 are handled for the definitive anchorage to the terminals of the stator and then the excess parts are cut away from the ends.

Figure 7:
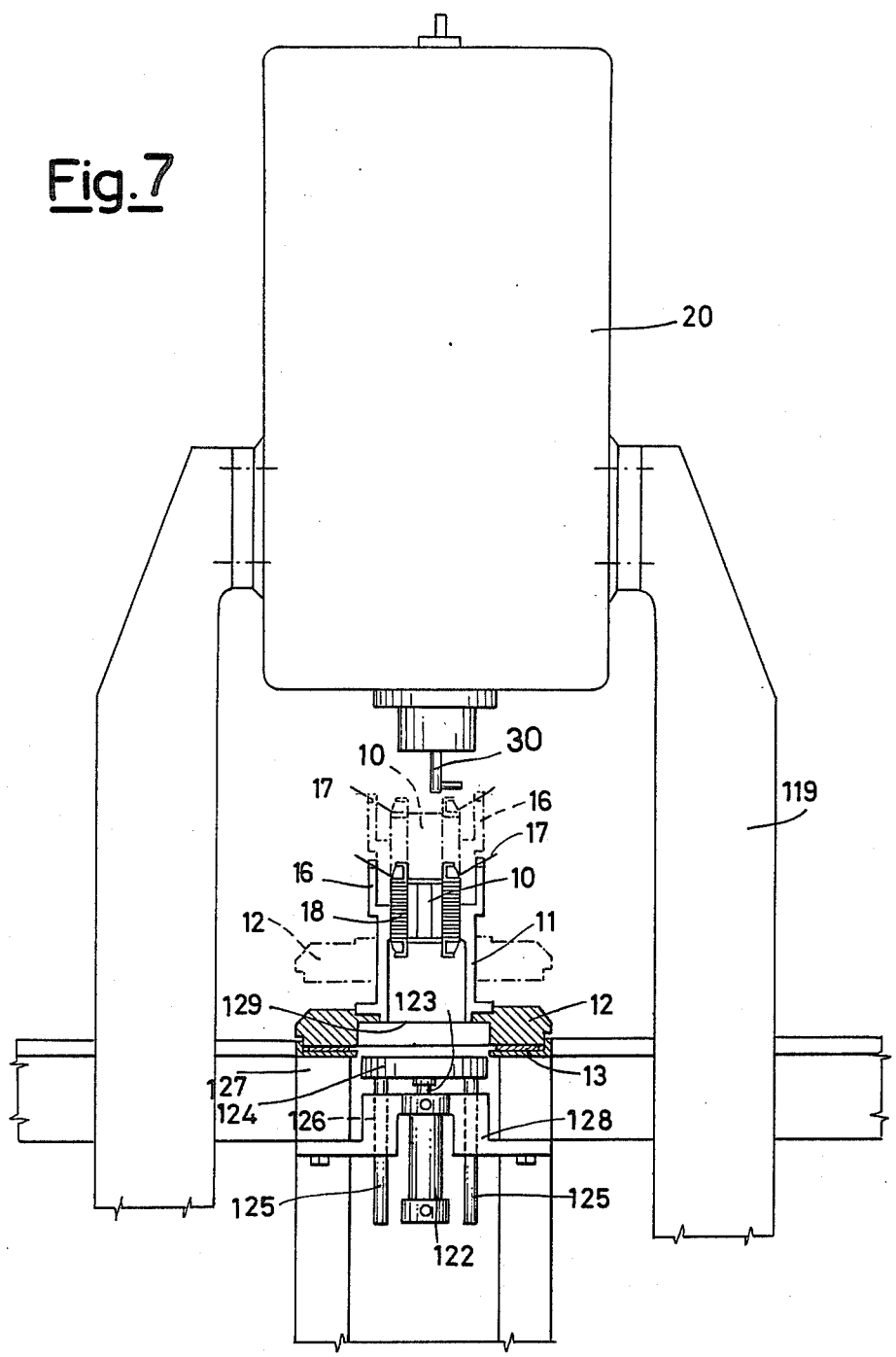
FIGS. 7 and 8 are transverse sectional views of a pallet transferring line according to yet another embodiment of the invention and in conjunction with two working stations of the type of those shown in FIG. 4.
Figure 8:
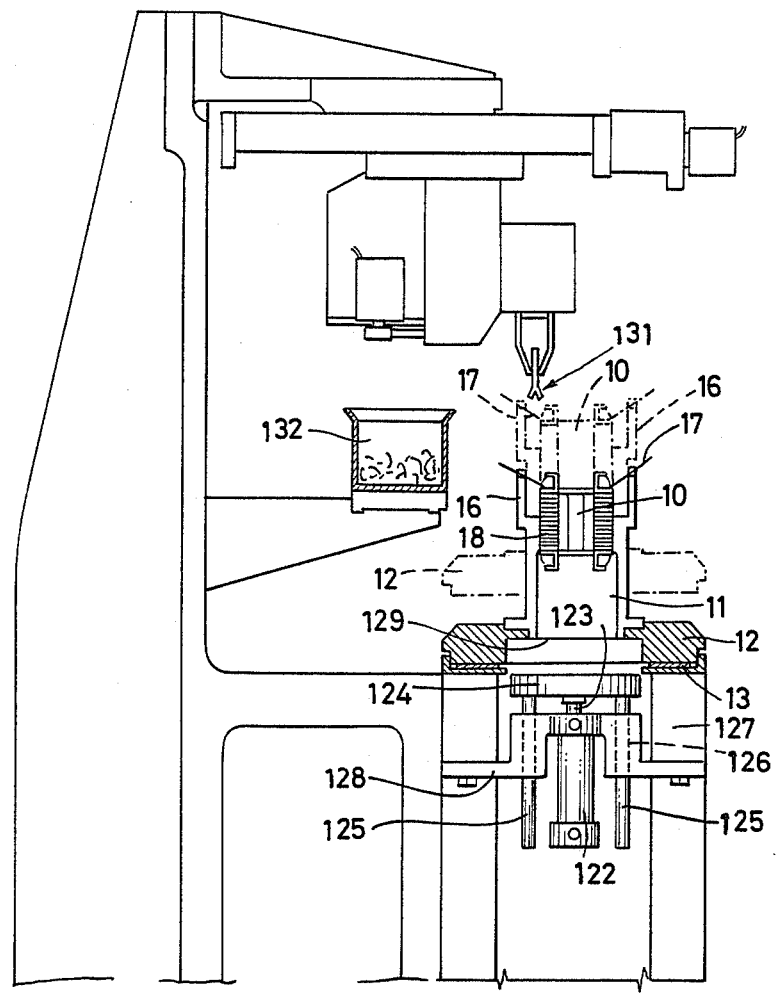

In the embodiment shown in FIGS. 7 and 8 the stator 10 is mounted on the pallet 12 exactly as in the first embodiment shown in Figures from 1 to 4, i.e. with its axis vertical. In this case also the reference numerals used in the Figures from 1 to 4 illustrate equal elements of the two embodiments. Since the system of movement of the pallets consists of a vertical translational movement, i.e. like that of the embodiment shown in FIGS. 5 and 6, the same reference numerals used for that method also indicate equal elements of this latter embodiment.

FIG. 7 shows again the station for forming the windings 18, which however this time is of the type with its axis vertical, shown diagrammatically with uprights 119 disposed at the sides of the line 13 and carrying the apparatus 20 which actuates the needle 30 which forms the windings 18.

As shown in FIG. 7, the pallet moves vertically from the position on the belt 13 shown by full lines to the working position shown by dashed lines. This movement is produced by means of the mechanisms already described for the preceding embodiment with reference to FIGS. 5 and 6.

After the winding has been terminated, cylinder 122 is actuated in the opposite direction and the pallet rests again on the belts 13 and is transferred into the next station. By way of example, this station is shown in FIG. 8 as a termination station. The same lifting device serving to lift the pallet from the belts 13 is provided at the termination station in order to align the stator 10 with the pliers 131 serving to handle the ends of the wires 17. As discussed above in connection with the other embodiments, the wire ends are temporarily anchored onto the appendixes 16 after the formation of the windings in the winding station. Pliers 131 insert the wire ends into the respective terminals located on the stator and cut away excess portions of the wire ends. The wire pieces cut away will then be left to drop from the pliers into the container 132.

We claim:

1. A production line for electric motor stators, which production line includes a plurality of stator-working stations therein and conveyor belt means in proximity to the stator-working stations for advancing the stators from station to station, comprising a plurality of pallets for rigidly, fixedly, individually supporting stators thereon during movement of said stators from station to station, said pallets including a base which rests on said conveyor belt means, an upwardly-extending hollow body within which the stator is fixed and appendices extending from said body arranged to temporarily receive the ends of wire windings formed on the stator at one of the stator-working stations; and, mechanical means in proximity to the stator-working stations for removing said pallets from the conveyor belt means and for rotating said pallets so that the respective stators become disposed in positions corresponding with the working stations located along the production line.

2. A production line for electric motor stators, which production line includes a plurality of stator-working stations therein and conveyor belt means in proximity to the stator-working stations for advancing the stators from station to station, comprising a plurality of pallets for rigidly, fixedly, individually supporting stators thereon during movement of said stators from station to station, the stators being mounted on said pallets with their axes substantially vertical; and, mechanical means in proximity to the stator-working stations for removing said pallets from the conveyor belt means and for rotating said pallets so that the respective stators become disposed in positions corresponding with the stator-working stations located along the production line, said rotation of said pallets being laterally to the line in order to position the stators with their axes substantially horizontal and perpendicular to the axis of the line.

3. A production line for electric motor stators, which production line includes a plurality of stator-working stations therein and conveyor belt means in proximity to the stator-working stations for advancing the stators from station to station, comprising a plurality of pallets for rigidly, fixedly, individually supporting stators thereon during movement of said stators from station to station, said pallets including a hollow body having a cradle-shaped portion thereon within which the stator is arranged with its axis horizontal and perpendicular to the axis of the line; and, mechanical means in proximity to the stator-working stations for removing said pallets from the conveyor belt means and for vertically translating said pallets so that the respective stators become disposed in positions corresponding with the working stations located along the production line.

4. A production line for electric motor stators, which production line includes a plurality of stator-working stations therein and conveyor belt means in proximity to the stator-working stations for advancing the stators from station to station, comprising a plurality of pallets for rigidly, fixedly, individually supporting stators thereon during movement of said stators from station to station; and, mechanical means in proximity to the stator-working stations for removing said pallets from the conveyor belt means and for vertically translating said pallets so that the respective stators become disposed in positions corresponding with the working stations located along the production line, said mechanical means including a cylinder positioned below the conveyor belt means, a stem operated by the cylinder and a fork rigidly connected to said stem and engageable with said pallet for vertically translating the latter upon actuation of said cylinder.

5. A line as claimed in claim 2, wherein said pallets each include a cylindrical outer body, and wherein the mechanical means which carry out the lateral rotation of the pallets consists of an arm provided at its ends with jaws for gripping the cylindrical body of the pallet; said mechanical means further including drive means for rotating the arm through 90°, between a horizontal end position and a vertical end position, and for causing the jaws to selectively close and open.

6. A line as claimed in claim 4, wherein said fork includes a pair of spaced arms, said conveyor belt means includes a frame having guides therein, said arms of the fork slide in said guides of the frame of the conveyor belt means, and said cylinder is rigidly connected to said frame.

* * * * *